United States Patent [19]

Sweetser et al.

[11] Patent Number: 5,532,484
[45] Date of Patent: Jul. 2, 1996

[54] DEFECTIVE PIXEL SIGNAL SUBSTITUTION IN THERMAL IMAGING SYSTEMS

[75] Inventors: Kevin N. Sweetser, Garland; Howard R. Beratan, Richardson; Robert A. Owen, Rowlett, all of Tex.

[73] Assignee: Texas Instruments Incorporated, Dallas, Tex.

[21] Appl. No.: 304,001

[22] Filed: Sep. 9, 1994

[51] Int. Cl.[6] .............................. H04N 5/33; H04N 7/18
[52] U.S. Cl. ........................................ 250/332; 250/349
[58] Field of Search ..................................... 250/332, 349

[56] References Cited

U.S. PATENT DOCUMENTS

| | | | |
|---|---|---|---|
| 3,846,820 | 11/1974 | Lampe et al. | 357/31 |
| 4,018,608 | 4/1977 | Frazier | 96/27 |
| 4,080,532 | 3/1978 | Hopper | 250/332 |
| 4,142,207 | 2/1979 | McCormack et al. | 358/113 |
| 4,143,269 | 3/1979 | McCormack et al. | 250/352 |
| 4,162,402 | 7/1979 | Hopper | 250/332 |
| 4,205,227 | 5/1980 | Reed | 250/330 |
| 4,275,302 | 6/1981 | Imbert et al. | 250/330 |
| 4,379,232 | 4/1983 | Hopper | 250/332 |
| 4,594,507 | 6/1986 | Elliott et al. | 250/331 |
| 4,705,361 | 11/1987 | Frazier et al. | 350/355 |
| 4,739,495 | 4/1988 | Levine | 364/571 |
| 4,751,387 | 6/1988 | Robillard | 250/331 |
| 4,994,672 | 2/1991 | Cross et al. | 250/330 |
| 5,010,251 | 4/1991 | Grinberg et al. | 250/332 |
| 5,021,663 | 6/1991 | Hornbeck | 250/349 |
| 5,047,644 | 9/1991 | Meissner et al. | 250/332 |
| 5,051,591 | 9/1991 | Trotta et al. | 250/351 |
| 5,101,271 | 3/1992 | Andrews et al. | 250/332 |
| 5,196,703 | 3/1993 | Keenan | 250/332 |
| 5,238,530 | 8/1993 | Douglas et al. | 156/635 |
| 5,264,326 | 11/1993 | Meissner et al. | 430/313 |
| 5,276,319 | 1/1994 | Hepfer et al. | 250/332 |

FOREIGN PATENT DOCUMENTS

| | | | |
|---|---|---|---|
| 939943 | 1/1974 | Canada | 88/7.5 |
| 2111746 | 9/1971 | Germany . | |
| 197806 | 11/1976 | Germany . | |
| 56-064570 | 1/1981 | Japan . | |
| 61-188965 | 8/1986 | Japan . | |
| 2251952 | 7/1992 | United Kingdom | G02F 1/015 |
| WO91/16607 | 10/1991 | WIPO | G01J 5/20 |

OTHER PUBLICATIONS

R. A. Wood, "HIDAD–A Monolithic, Silicon, Uncooled Infrared Imaging Focal Plane Array," *HIDAD*, date unknown, pp. 579–581.

Primary Examiner—Davis L. Willis
Assistant Examiner—Richard Hanig
Attorney, Agent, or Firm—Ruben C. DeLeon; James C. Kesterson; Richard L. Donaldson

[57] ABSTRACT

Thermal imaging system (10) includes a focal plane array (18) having pixels (20). Signals produced by pixels (20) are addressed by integrated circuit substrate (22) and passed to video processor (24). Video processor (24) includes, among other modules, a detection and substitution module (28) that detects defective pixels (21) and substitutes the signals produced by defective pixels (21). The detection and substitution of signals produced by defective pixels (21) may be performed while viewing the thermal scene (12) or while stimulating pixels (20) with a stimulus. A thermal stimulus may be generated by a thermoelectric cooler (50) thermally coupled to integrated circuit substrate (22) and focal plane array (18). An electrical stimulus to identify defective pixels (21) may also be delivered to pixels (20) of focal plane array (18).

20 Claims, 3 Drawing Sheets

DEFECTIVE PIXEL SIGNAL SUBSTITUTION IN THERMAL IMAGING SYSTEMS

TECHNICAL FIELD OF THE INVENTION

This invention relates to thermal (infrared) imaging systems, and more particularly to defective pixel signal substitution in thermal imaging systems.

BACKGROUND OF THE INVENTION

One common application for thermal sensors is in thermal (infrared) imaging systems such as night vision equipment. One class of thermal imaging systems includes a focal plane array of thermal sensors or pixels coupled with an integrated circuit substrate. The signals from the pixels are addressed by the integrated circuit substrate and processed to produce a picture of a thermal scene.

Typically, thermal imaging systems undergo testing prior to delivery to calibrate the sensitivity of individual pixels and to identify defective pixels. This pre-delivery testing may include flooding the thermal imaging system with a uniform infrared source, capturing the signals produced by the pixels, and identifying as defective those pixels that respond to the thermal energy with signals outside a target range. The identified defective pixel signals may be substituted with signals of adjacent operative pixels to produce a picture of the thermal scene with minimum distortion. The identity of defective pixels may be programmed into a memory, such as an EPROM, EEPROM, or SRAM, which is supplied to the customer at delivery.

There is a high probability that some pixels will become defective with extended use. Even small percentages of additional, nonsubstituted signals from defective pixels may severely degrade the displayed picture of the thermal scene, as well as the customer's perception of the product. Several approaches have attempted to perform substitution of defective pixel signals, but these systems are complex, costly, and may be incompatible with the space and power limitations of thermal imaging systems in a tactical environment.

SUMMARY OF THE INVENTION

In accordance with one aspect of the present invention, the disadvantages and problems associated with pixel substitution processing in thermal imaging systems have been substantially reduced or eliminated. One aspect of the present invention may include performing low complexity pixel substitution processing using reference equipment already resident in the delivered thermal imaging system.

One aspect of the present invention may include an apparatus for defective pixel signal substitution in a thermal imaging system. The thermal imaging system may include a focal plane array having at least three pixels. The apparatus may include addressing circuitry for addressing a signal produced by at least one of the pixels. A reference generator may generate a reference value for the pixel. A subtractor may have a first input coupled to the addressing circuitry and a second input coupled to the reference generator and may output an error value representing a comparison of the produced signal to the reference value. A comparator may be coupled to the subtractor to compare the error value to a predetermined threshold and to generate a substitution flag if the error value exceeds the predetermined threshold. A substitutor may be coupled to the comparator to substitute the produced signal of the pixel with a selected signal in response to the substitution flag.

Another aspect of the present invention may include a method for post-delivery defective pixel signal substitution in a thermal imaging system. The thermal imaging system may include a focal plane array having at least three pixels. A signal produced by at least one of the pixels may be addressed. A reference value for the pixel may also be generated. An error value may be generated that represents a comparison of the produced signal to the reference value. A substitution flag may be generated if the error value exceeds a predetermined threshold. The produced signal of the pixel may be substituted with a selected signal in response to the substitution flag.

Important technical advantages of the present invention can include updating the list of defective pixels in the thermal imaging system after delivery to the customer. Through extended use, pixels in a thermal imaging system may degrade in performance. This change in pixel sensitivity may produce a distorted picture of the thermal scene. One embodiment of the present invention allows a thermal imaging system to reevaluate the performance of individual pixels. This is accomplished by substituting the signal produced by a defective pixel with a signal or combination of signals produced by one or more adjacent properly functioning pixels to produce a higher quality and more accurate representation of the thermal scene. Post-delivery pixel signal substitution or compensation may be performed at selected times during the product life cycle, such as during initial system power application and at planned maintenance intervals.

Important technical advantages of the present invention can also include a low cost and low complexity defective pixel signal substitution scheme. Instead of using an expensive and bulky thermal reference to stimulate the focal plane array for subsequent determination of defective pixels, the present invention may avoid the cost and complexity of such a system by stimulating the pixels using components already in the thermal imaging system. In one embodiment, a common electrode coupled to the focal plane array is modulated with a low level varying voltage superimposed on a bias voltage to stimulate the system. In another embodiment, a thermoelectric cooler may be driven to vary the temperature of the focal plane array, which causes modulation of the pixel signals for detection and substitution. In another embodiment, the stimulus is provided from the actual thermal scene viewed by the thermal imaging system. Each of these stimuli provide information concerning the number and location of defective pixels. This information may be used either independently or in conjunction with pre-delivery calibration data to make substitution decisions.

Further important technical advantages of the present invention can include driving the pixels with a varying stimulus to allow excursion of the pixel signals over an anticipated operating region. By either superimposing a low level varying voltage on a bias voltage to the common electrode or by applying an alternating control signal to the thermoelectric controller, the present invention may stimulate the pixels of the focal plane array with a known input signal through an expected operating region. Subsequent processing electronics evaluate each pixel's response to this stimulus and determine which pixel signals are beyond acceptable thresholds. These varying stimuli can allow the present invention to more accurately and effectively identify and substitute signals from defective pixels.

Additional important technical advantages of the present invention can include pixel signal substitution within the capabilities of small, low cost thermal sensors. The present invention may compare each pixel signal to one or more neighboring pixel signals so that the difference or ratio represented by an error value can be compared to a predetermined threshold. The threshold may represent the expected signal variation in neighboring pixels viewing a high contrast scene as limited by the thermal imaging system's modulation transfer function (MTF). This approach avoids complex spatial processing often present in previous systems and may be used with any of the stimuli contemplated by the present invention.

Important technical advantages of the present invention can also include comparing a suspected pixel to an adjacent pixel and associating the adjacent pixel signal with the suspected pixel if it is found to be defective. In one embodiment, signals produced by pixels may be addressed sequentially, pixel-by-pixel and row-by-row, until all pixels in the focal plane array supply their respective signals for a video frame. In this embodiment, relatively simple analog or digital circuitry may implement instantaneous substitution of a signal produced by a defective pixel with a signal produced by a previous pixel in the processing chain.

Further important technical advantages of the present invention can include either instantaneous or filtered substitution of defective pixel signals. In one embodiment, the present invention may detect a defective pixel and instantaneously replaces its signal with an adjacent pixel signal or a combination of adjacent pixel signals. In another embodiment, the present invention may include a filter to make the substitution decision over more than one video frame to reduce the possibility of an unnecessary or erroneous substitution. A memory unit in the filter may store the identity of defective pixels for video processing even when the system for detection of defective pixels is deactivated.

Additional important technical advantages of the present invention can include post-delivery calibration of operative pixels to provide a higher quality picture of the thermal scene. In addition to substituting signals from defective pixels, the present invention may also update the calibration tables of operative pixels. Therefore, the present invention may allow pixel calibration values to be continually updated to achieve maximum performance of the thermal imaging system.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

The present invention and its advantages are best understood by referring to FIGS. 1–4 of the drawings, like numerals being used for like and corresponding parts of the various drawings.

Figure 1:
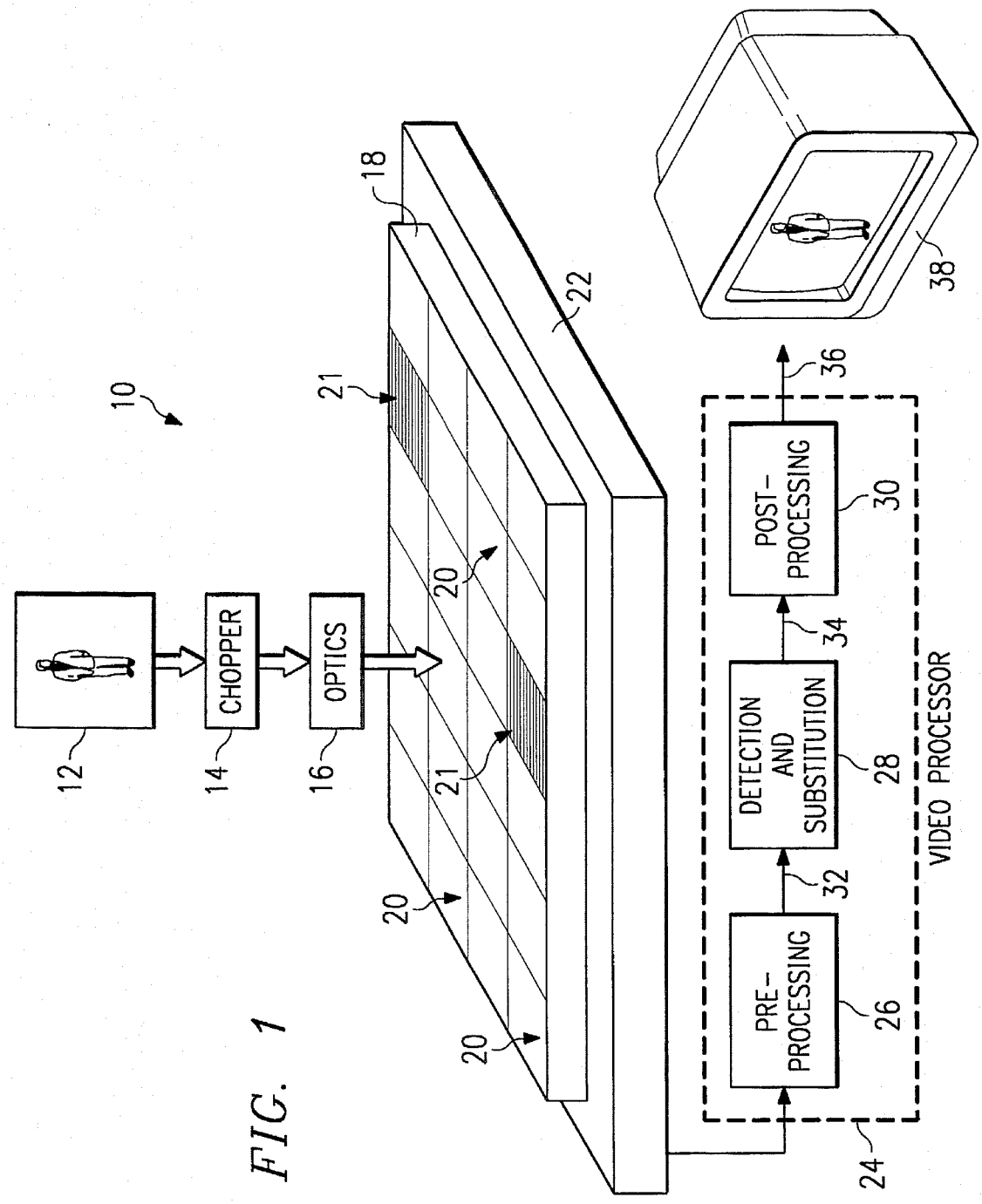
FIG. 1 illustrates the operation of a thermal imaging system having a focal plane array and integrated circuit substrate coupled to a video processor for processing pixel signals to drive a monitor that displays an image of a thermal scene.

FIG. 1 illustrates the major components of thermal imaging system 10. Typically, thermal imaging system 10 undergoes testing prior to delivery to calibrate the sensitivity of individual pixels and to identify defective pixels. This testing may include an expensive and bulky thermal reference mechanism, such as a uniform infrared source, to identify defective pixels that produce signals outside a target range. There is also a high probability that some pixels may become defective after delivery to the customer. Several approaches have attempted to perform substitution of defective pixel signals, but these systems are complex, costly, and may be incompatible with the space and power limitations of thermal imaging systems. The present invention solves these problems related with prior art thermal imaging systems by performing low complexity pixel substitution processing using reference equipment already resident in the delivered thermal imaging system 10.

A thermal scene 12 emits thermal (infrared) radiation, which is passed by chopper 14 and optics 16, and impinges on focal plane array 18. Chopper 14 acts as a shutter to alternately pass and block thermal radiation from thermal scene 12. The chopper frequency is typically tuned to the video frame rate of thermal imaging system 10. When blocking, chopper 14 prevents the impingement of thermal radiation from thermal scene 12 on focal plane array 18. Optics 16 condition infrared radiation from thermal scene 12 for presentation to focal plane array 18. It should be understood that the present invention contemplates any suitable optics to refract, diffuse, focus, or in any way condition the thermal radiation impinging on focal plane array 18. Furthermore, optics 16 may be placed between thermal scene 12 and chopper 14, between chopper 14 and focal plane array 18, or on either side of chopper 14 without departing from the scope of the present invention.

Focal plane array 18 comprises a plurality of thermal sensors or pixels 20. The quantity and configuration of pixels 20 depends on the desired N by M dimensions of focal plane array 18. As illustrated in FIG. 1, pixels 20 are represented as spaced areas on a continuous sheet. However, it should be understood that the present invention contemplates any type of pixel, whether attached to adjacent pixels or standing alone, that can produce a signal representative of the amount of thermal radiation incident to its face. In one embodiment, pixels 20 are formed in part from a pyroelectric element (not shown), such as barium strontium titanate (BST), that changes its electrical characteristics in response to a change in temperature. In another embodiment, pixels 20 may produce a change in voltage due to a photon-electron interaction within the material used to form pixels 20. In another embodiment, signals produced by pixels 20 may be based upon the change in resistance or capacitance of a thin material film caused by the heating effect of incident infrared radiation.

Defective pixels 21 of focal plane array 18 are shaded in FIG. 1. Defective pixels 21 do not produce signals in a desired operating region. Therefore, defective pixels 21 may exhibit undesirable high or low sensitivity to thermal radiation or may be completely inoperative. The dynamic calibration range to normalize signals produced by pixels 20 will generally determine the allowable range of sensitivity of operative pixels 20. Over time, defective pixels 21 may be recharacterized as operative and previously operative pixels 20 may be recharacterized as defective. The relative number of defective pixels 21 shown in FIG. 1 is exaggerated for illustrative purposes.

The sensor signals produced by pixels 20 are received by integrated circuit substrate 22. U.S. Pat. No. 4,143,629 entitled "Ferroelectric Imaging System," issued to McCormack, et al. and assigned to Texas Instruments, Incorporated, provides information concerning thermal detectors fabricated from an array of thermally sensitive elements coupled to a silicon switching matrix or integrated circuit substrate. It should be understood that the present invention may be used with any appropriate addressing circuit capable of receiving or addressing signals produced by pixels 20 of focal plane array 18.

The signals produced by pixels 20 are passed through integrated circuit substrate 22 to video processor 24. In one specific embodiment, focal plane array 18 comprises a 245 by 328 pixel matrix. Integrated circuit substrate 22 may have addressing circuitry that addresses the signal produced by each pixel 20 sequentially and passes the pixel signals to video processor 24. For example, video processor 24 may receive in sequence 245 rows of 328 pixels each, or 80,360 pixels total, for each complete video frame produced by thermal imaging system 10. Integrated circuit substrate 22 and video processor 24 may process signals from pixels 20 of focal plane array 18 in a serial manner, but it should be understood that the present invention also contemplates partial or complete parallel operation using multiple signal paths to increase processing throughput. In addition, video processor 24 is illustrated as separate from integrated circuit substrate 22, but it should be understood that video processor 24 may be part of integrated circuit substrate 22.

Video processor 24, described in detail with reference to FIG. 4, contains at least three modules: a pre-processing module 26, a detection and substitution module 28, and a post-processing module 30. In general, pre-processing module 26 conditions the signals produced by pixels 20 into processed signals 32 for presentation to detection and substitution module 28. Detection and substitution module 28 compares a processed signal from a selected pixel 20 with a signal produced by a neighboring pixel or an average of signals produced by more than one neighboring pixels to determine whether the selected pixel 20 is a defective pixel 21. Detection and substitution module 28 either instantaneously or after one or more video frames substitutes the signals produced by defective pixels 21. Post-processing module 30 receives signals 34 that may include signals produced by operative pixels 20 and substituted or strapped signals for defective pixels 21. Post-processing module 30 may perform global adjustment of the signals 34 and may add video synchronizing information and any desired symbology to produce video signals 36 for display on monitor 38.

In operation, thermal imaging system 10 receives thermal radiation from thermal scene 12 through chopper 14 and optics 16. The thermal radiation is presented to focal plane array 18 and each pixel 20 produces a signal representative of the amount of thermal radiation incident to its face. These signals are then addressed by integrated circuit substrate 22 and passed to video processor 24. Among other modules, video processor 24 contains detection and substitution module 28 which performs a comparison of spatially related pixel signals and tests against a threshold to determine the possible existence of defective pixels 21. Detection and substitution module 28 replaces the signal from any defective pixels 21 with a selected signal to improve the overall picture quality and accuracy of thermal scene 12 displayed on monitor 38.

Before delivery to a customer, thermal imaging system 10 may undergo a checkout sequence to calibrate pixels 20 and to identify defective pixels 21 that do not experience the desired operating characteristics. The location of defective pixels 21 may be stored in memory (not shown) and used during the processing of pixel signals in video processor 24. The present invention, however, may also detect additional defective pixels 21 over the lifetime of thermal imaging system 10. To perform post-delivery pixel signal substitution, thermal imaging system 10 may be exposed to a variety of stimuli that cause an excursion of signals produced by pixels 20. Each of the stimuli provide information concerning the number and location of any defective pixels 21. This information may be used either independently or in conjunction with pre-delivery calibration data, that may be stored in memory, to make substitution decisions.

One stimulus contemplated by the present invention is the thermal scene 12 itself. This scene-based substitution could typically occur during system operation. An alternative thermal stimulus may be generated by driving a thermoelectric cooler thermally coupled to integrated circuit substrate 22 and focal plane array 18 to produce an excursion in the signals produced by pixels 20, as described with reference to FIG. 2. An electrical stimulus may be generated by driving a common electrode electrically coupled to each pixel 20, as described with reference to FIG. 3. Both the thermoelectric cooler stimulus and the common electrode stimulus can be applied at selected times during the product life cycle, such as before delivery to the customer, during initial system power application, and at scheduled maintenance intervals.

Figure 2:
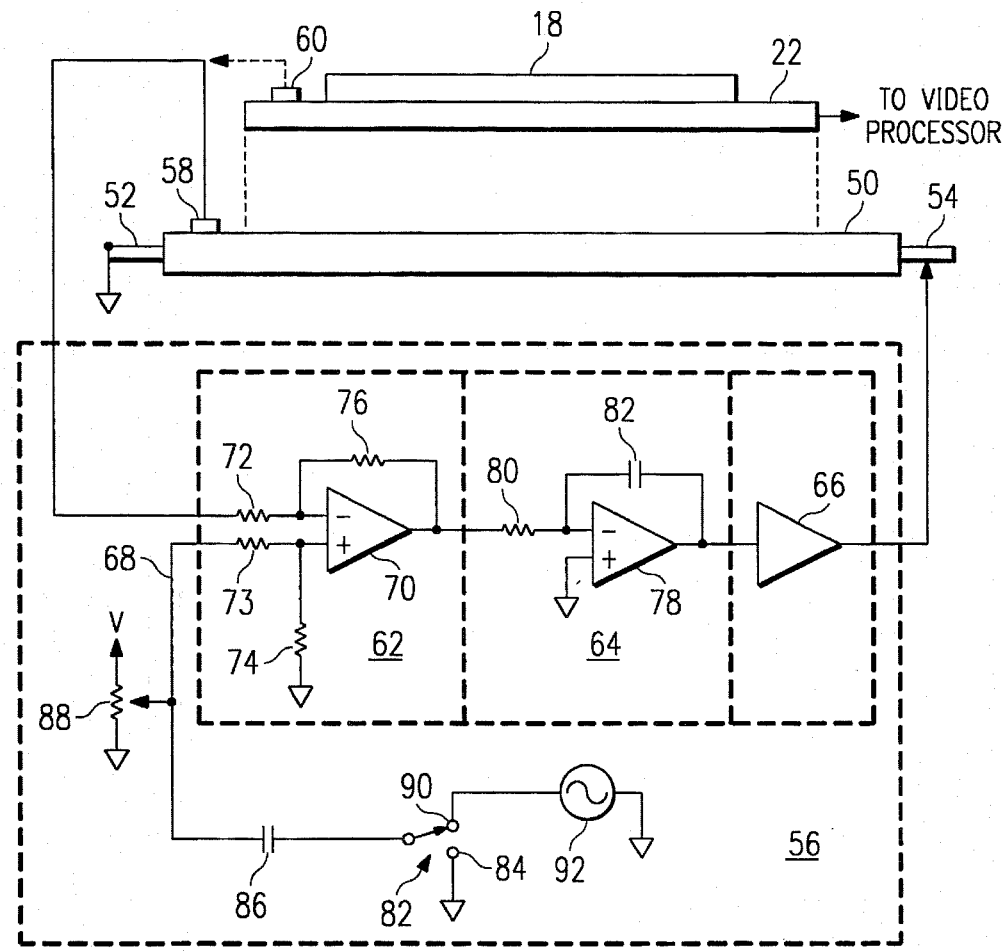
FIG. 2 is a schematic representation of one embodiment of the present invention that utilizes a thermoelectric cooler with an associated thermoelectric controller to stimulate the pixels in the focal plane array.

FIG. 2 illustrates the application of a thermal stimulus using a thermoelectric cooler 50 thermally coupled to integrated circuit substrate 22 and focal plane array 18. In this embodiment, thermal imaging system 10 includes thermoelectric cooler 50 to stabilize the temperature of focal plane array 18 and integrated circuit substrate 22 at or near room temperature. Temperature stabilization using thermoelectric cooler 50 minimizes the effects of temperature variations on focal plane array 18 and allows thermal imaging system 10 to produce a consistent and high quality picture of thermal scene 12. Thermoelectric cooler 50 may be bonded to integrated circuit substrate 22 using any suitable technique. Temperature variations of thermoelectric cooler 50 cause a resulting temperature fluctuation in both integrated circuit substrate 22 and focal plane array 18.

Thermoelectric cooler 50 typically operates using the Peltier cooling effect which causes an absorption or generation of heat as current passes through a junction of two dissimilar materials. In one embodiment, thermoelectric elements (not shown) of thermoelectric cooler 50 are formed from semiconductor materials, such as bismuth telluride, having the desired dissimilar characteristics. The present invention contemplates the use of any thermoelectric cooler or other suitable device, such as a light emitting diode (LED) or thin film resistor, to alternately heat and cool pixels 20 to perform post-delivery detection and substitution. Furthermore, the device to alternately heat and cool pixels 20 may be physically separated from focal plane array 18 and integrated circuit substrate 22. One suitable thermoelectric cooler is the single-stage thermoelectric cooler, model number SP-1794, manufactured by Marlow Industries.

Thermoelectric cooler 50 has two leads 52 and 54 that provide a potential across thermoelectric elements to produce the desired heating and cooling effects. Lead 52 is shown to be grounded, whereas lead 54 receives a drive signal from thermoelectric controller 56, described below. Thermoelectric cooler 50 may heat or cool integrated circuit substrate 22 and focal plane array 18, depending on the polarity of the potential applied across leads 52 and 54.

Temperature sensor 58 coupled to thermoelectric cooler 50 provides a temperature signal to thermoelectric controller 56. In another embodiment, temperature sensor 60 coupled with or integral to integrated circuit substrate 22 provides the temperature signal to thermoelectric controller 56. The present invention contemplates any suitable temperature sensor mounted on or in proximity to focal plane array 18, integrated circuit substrate 22, or thermoelectric cooler 50, that operates in the desired temperature range and with the desired sensitivity. One suitable temperature sensor 58 that may be used with the present invention is an integrated circuit precision temperature sensor, model number LM-135, manufactured by National Semiconductor.

Thermoelectric controller 56 receives the temperature signal from temperature sensor 58 and drives thermoelectric cooler 50 by applying a potential across leads 52 and 54. Although FIG. 2 illustrates thermoelectric controller 56 driving lead 54 while lead 52 is grounded, the present invention also contemplates driving thermoelectric cooler 50 differentially at both leads 52 and 54.

Thermoelectric controller 56 is composed in part of error amplifier 62, integrator 64, and power driver 66. Error amplifier 62 receives both the temperature signal from temperature sensor 58 and control signal 68. The temperature signal from temperature sensor 58 is coupled to the negative input of operational amplifier 70 through resistor 72. The positive input to operational amplifier 70 is coupled to control signal 68 through resistor 73, which is in turn coupled to ground through resistor 74. The negative input of operational amplifier 70 is coupled to the output of operational amplifier 70 through resistor 76.

The output of operational amplifier 70, representing an error signal between control signal 68 and the temperature signal from temperature sensor 58, is fed into integrator 64. The output of operational amplifier 70 is coupled to the negative input of operational amplifier 78 through resistor 80. The positive input of operational amplifier 78 is coupled to ground. The negative input of operational amplifier 78 is coupled to the output of operational amplifier 78 through capacitor 82. The output of operational amplifier 78, representing the integrated error, is fed into power driver 66, which drives lead 54 of thermoelectric cooler 50.

Thermoelectric controller 56 adjusts the temperature of thermoelectric cooler 50 in response to control signal 68. The character of control signal 68 depends on the position of switch 82. In normal operation mode, switch 82 contacts ground terminal 84, capacitor 86 acts as a filter, and control signal 68 assumes a temperature set point voltage determined by variable resistor 88. In substitution processing mode, switch 82 contacts terminal 90, and control signal 68 comprises a low level varying voltage generated by source 92 superimposed on the temperature set point voltage. In this switch setting, thermoelectric cooler 50 may be driven to vary its temperature about a temperature set point to allow for a temperature excursion of pixels 20 in focal plane array 18. Source 92 may generate a sinusoid, a square wave, a sawtooth wave, or any other suitable wave form, whether periodic or not, that provides a stimulus to pixels 20.

In one embodiment, the low level varying voltage from source 92 may be applied when focal plane array 18 is not stimulated by infrared radiation. For example, chopper 14 may be set to block all thermal radiation from impinging on focal plane array 18 or set to pass thermal radiation to focal plane array 18 from a relatively motionless scene. Upon activating the substitution processing mode, integrated circuit substrate 22 delivers signals produced by pixels 20 to video processor 24. The excursion of signals produced by pixels 20 allows detection and substitution module 28 to identify defective pixels 21, as described below with reference to FIG. 4.

Figure 3:
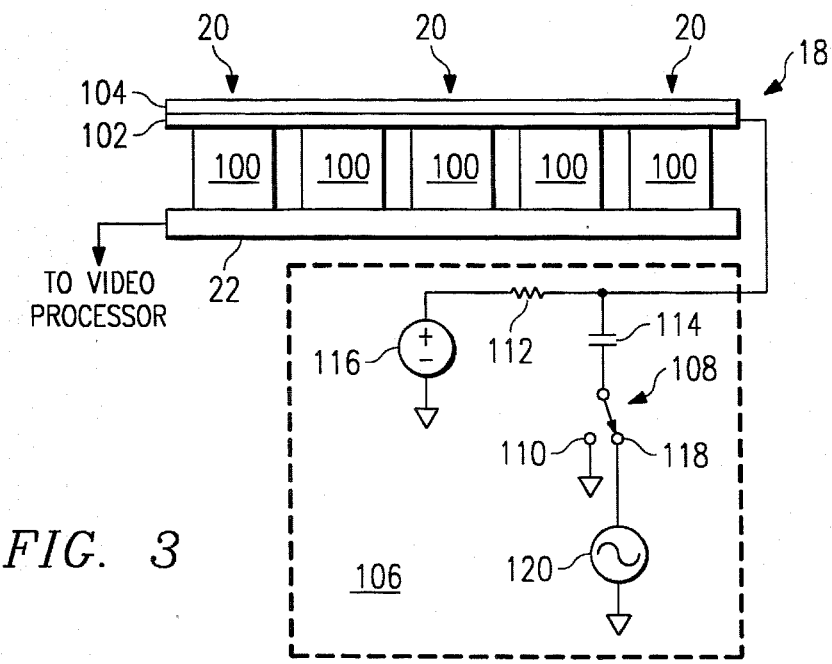
FIG. 3 is a schematic representation of another embodiment of the present invention that utilizes a common electrode with an associated voltage supply circuit to stimulate the pixels in the focal plane array.

An alternative embodiment of the present invention is shown in FIG. 3 which illustrates electrical stimulation of a particular focal plane array 18 to produce the necessary signal excursions of pixels 20 for detection and substitution processing. For this particular embodiment, focal plane array 18 comprises an array of thermally sensitive elements 100 disposed between integrated circuit substrate 22 and common electrode 102. Common electrode 102 may be electrically coupled on one side with thermally sensitive elements and on the other side with infrared absorber layer 104. In this embodiment, each pixel in focal plane array 18 is defined by thermally sensitive element 100 and an associated section of common electrode 102 and infrared absorber layer 104. In operation, common electrode 102 supplies a bias voltage to thermally sensitive elements 100.

Thermally sensitive elements 100 may be formed from barium strontium titanate (BST), materials from the lead titanate family including lead titanate (PT), lead lanthanum titanate (PLT), lead zirconate titanate (PZT), and lead lanthanum zirconate titanate (PZLT), as well as any other suitable material that changes its electrical characteristics in response to thermal radiation. Common electrode 102 may be formed from a metal, cermet, semiconductive material, or other appropriate material that can deliver a common potential to thermally sensitive elements 100. Infrared absorber layer 104 may be formed from an organic material, such as parylene, and may be covered with a thin, semi-transparent metal (not shown) whose thickness is adjusted to maximize infrared absorption.

Coupled to common electrode 102 is voltage supply circuit 106 which may assume two modes based on the position of switch 108. In normal operation mode, switch 108 contacts ground terminal 110, and resistor 112 and capacitor 114 act as a filter to decouple a bias voltage supplied to common electrode 102 by DC source 116. In substitution processing mode, switch 108 contacts terminal 118 and voltage supply circuit 106 supplies common electrode 102 with a low level varying voltage from source 120 superimposed on the bias voltage from DC source 116. In one embodiment, focal plane array 18 may be blocked from varying incident infrared radiation while pixels 20 are stimulated over their operating range by the low level varying voltage generated from source 120. The signals produced by the stimulated pixels 20 may then be sent to video processor 24 for detection and substitution processing. FIG. 3 illustrates voltage supply circuit 106 as having both a DC source 116 and a second source 120, but the present invention contemplates single or multiple sources to generate the voltage supplied to common electrode 102.

The present invention also contemplates application of a modulating voltage to pixels 20 in focal plane array 18 without common electrode 102. In this embodiment, pixels 20 are electrically isolated from adjacent pixels 20. This pixel configuration allows integrated circuit substrate 22 to supply a modulating voltage to and receive a sensor signal from pixels 20. To stimulate pixels 20 for detection and substitution processing, voltage supply circuit 106 supplies a low level varying voltage from source 120 superimposed on a bias voltage from DC source 116 to pixels 20 through contacts (not shown) on integrated circuit substrate 22.

Figure 4:
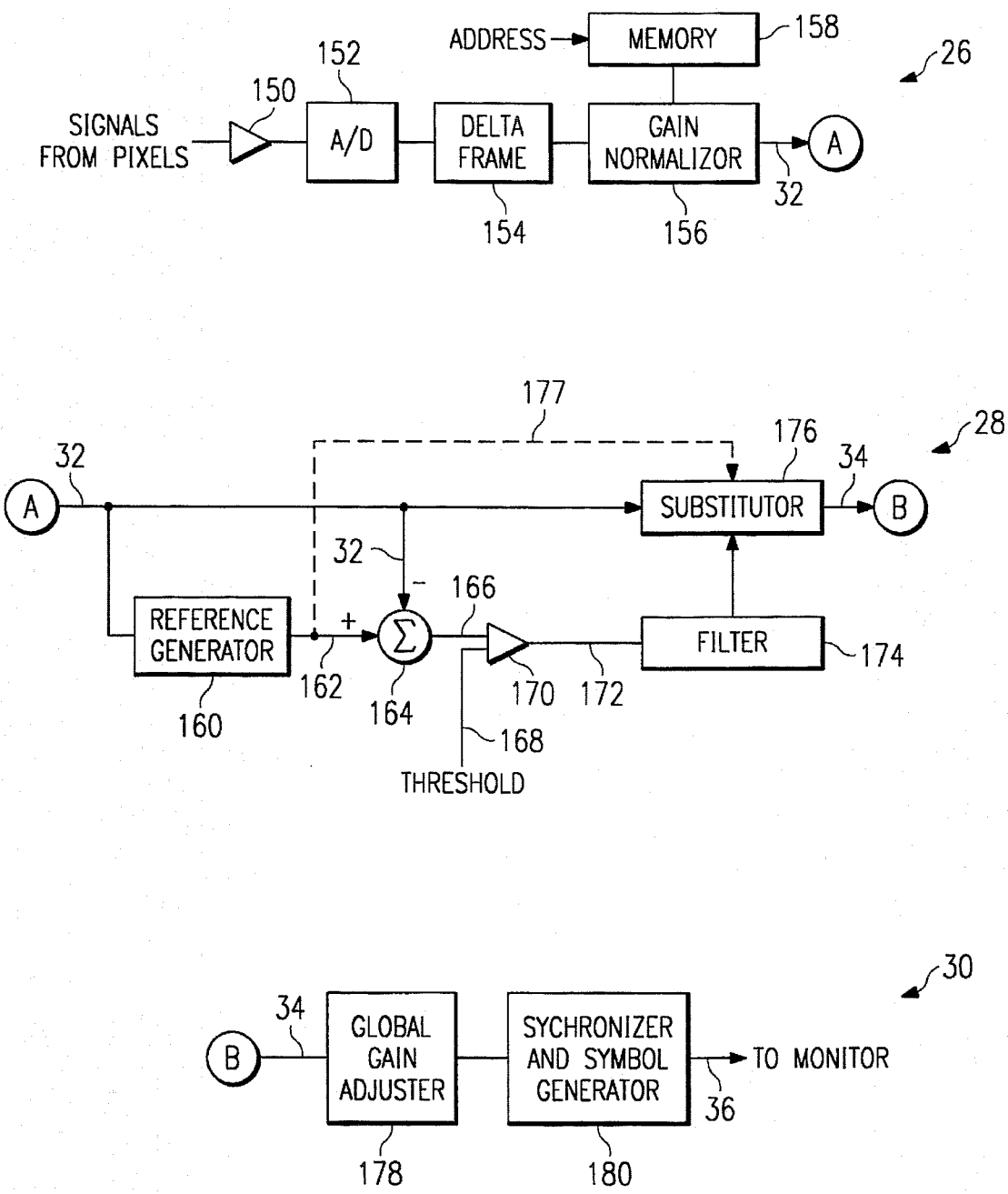
FIG. 4 is a functional block diagram of a video processor used in accordance with one aspect of the present invention that includes a pre-processing module, a detection and substitution module, and a post-processing module that delivers a video signal of the thermal scene to a monitor for display.

FIG. 4 provides a functional block diagram of video processor 24, including details of pre-processing module 26, detection and substitution module 28, and post-processing module 30. The components of video processor 24 are shown in a particular order, but it should be understood that the present invention contemplates any ordering of video processing components that receive signals from focal plane array 18 and produce video signals for display on monitor 38.

Pre-processing module 26 receives signals produced by pixels 20 exposed to one of the stimuli described above with reference to FIGS. 1 through 3. The signals are amplified at amplifier 150 and then converted into a digital format using analog-to-digital converter 152. It should be understood that analog video processing techniques may be used without departing from the scope of the present invention, which would eliminate the need for analog-to-digital converter 152. The signal-to-noise ratio (SNR) of the signals may be improved by a technique that takes advantage of the symmetric signal produced by pixels 20 as they are alternately exposed and blocked from infrared radiation by chopper 14. By inverting and adding adjacent symmetric signals, delta frame processor 154 doubles the signal and improves overall SNR.

Gain normalizer 156 normalizes the pixel signals using calibration tables stored in memory 158. Because of variations introduced during the fabrication process, each pixel 20 may experience a different sensitivity to stimuli. To compensate for the different sensitivities of pixels 20, a pre-delivery calibration may be performed and calibration values stored in memory 158. The present invention may also perform a post-delivery re-calibration of pixels 20 and update memory 158. Both pre-delivery and post-delivery calibration may be performed using the thermoelectric cooler stimulus described with reference to FIG. 2, the common electrode stimulus described with reference to FIG. 3, or a uniform infrared source.

In one embodiment, integrated circuit substrate 22 addresses signals produced by pixels 20, pixel-by-pixel and row-by-row, and supplies a serial stream of pixel signals to video processor 24. As the signals from pixels 20 are sequentially addressed by integrated circuit substrate 22 and passed to video processor 24, memory 158 must be properly synchronized with the serial stream of pixel signals to supply the proper calibration values. Synchronization may be accomplished by providing an address to memory 158 generated by integrated circuit substrate 22. After gain normalization, processed signals 32 are input to detection and substitution module 28.

It should be understood that portions of detection and substitution module 28 may be activated or deactivated depending on the current operational mode of thermal imaging system 10. For example, detection and substitution module 28 may be activated, either pre-delivery or post-delivery, when incoming thermal radiation is unvarying or blocked to identify defective pixels 21. Updated information on defective pixels 21 may be stored in a memory (not shown), such as an EPROM, EEPROM, SRAM, or other appropriate memory device. Thermal imaging system 10 may then deactivate the detection portion of detection and substitution module 28, but continue to substitute signals produced by identified defective pixels 21 while viewing thermal scene 12. Alternatively, detection and substitution module 28 may perform in real-time by detecting and substituting signals produced by defective pixels 21 while viewing thermal scene 12.

The following describes the operation of detection and substitution module 28 on processed signal 32 originating from a selected pixel 20 in focal plane array 18. Processed signal 32 is fed into reference generator 160 which generates a reference value 162 for comparison to processed signal 32 for purposes of defective pixel detection. In one embodiment, reference generator 160 may be analog or digital circuitry that delays reference value 162 by one cycle from processed signal 32. If integrated circuit substrate 22 addresses signals from pixels 20 pixel-by-pixel and row-by-row, then signals adjacent in time along the processing path of detection and substitution module 28 correspond to pixels 20 adjacent in space on focal plane array 18. Integrated circuit substrate 22 may address the rows of focal plane array 18 in a bidirectional, serpentine manner to ensure each successively addressed pixel 20 is adjacent in space on focal plane array 18.

Reference generator 160 may also combine signals from two or more spatially related pixels 20. Furthermore, reference value 162 may be the average of all signals received from pixels 20 in one frame or over multiple frames. It should be understood that the present invention contemplates any combination of signals from pixels 20 to generate a reference signal 162 that may be used to identify defective pixels 21.

Subtractor 164 receives processed signal 32 and reference value 162 and produces error value 166. Error value 166 may represent the difference between processed signal 32 and reference value 162, a ratio between processed signal 32 and reference value 162, or a combination of a difference and a ratio. Subtractor 164 may be a simple subtractor, a difference amplifier, or any appropriate device that can generate a signal representing the difference or ratio between processed signal 32 and reference value 162. If error value 166 exceeds predetermined threshold 168 then selected pixel 20 is recharacterized as defective pixel 21. In response to detecting defective pixel 21, comparator 170 outputs substitution flag 172 to optional filter 174. Substitution flag 172 may be any information generated by comparator 170 that indicates error value 166 exceeds predetermined threshold 168. Filter 174 may process and store substitution flag 172 and issue a command to substitutor 176 to replace processed signal 32 of defective pixel 21 with a selected signal. In one embodiment, the selected signal is reference value 162 generated by reference generator 160 and passed to substitutor 176 over dashed line 177.

As described above, reference generator 160 may incorporate analog or digital circuitry that allows comparison of signals from adjacent pixels 20 addressed sequentially in time. Reference generator 160 may also implement a filter (not shown), with or without a memory, that generates reference value 162 based on current or past signals from neighboring pixels 20. Threshold 168 may relate to the maximum difference or ratio expected between adjacent pixels 20 as limited by the system modulation transfer function (MTF). The MTF relates to the spatial roll off frequency of a single pixel 20 exposed to an ideal point source of infrared radiation. If the signal produced by adjacent pixels 20 is greater than what would be expected from a single point source, then one of pixels 20 is characterized as defective. The MTF is a function of the thermal isolation between adjacent pixels 20, the thermal isolation between pixels 20 and integrated circuit substrate 22, and the non-ideal optics 16 used to focus thermal scene 12 on focal plane array 18. Threshold 168 may also be a function of other factors, such as the dynamic range or sensitivity of pixels 20.

As described above, filter 174 is optional. Without filter 174, detection and substitution module 28 performs an instantaneous substitution if the error value 166 generated by comparing processed signal 32 to reference value 162 exceeds predetermined threshold 168. Filter 174 may accumulate and process substitution flags 172 to allow the substitution decision to be made over time to prevent unnecessary or erroneous substitutions. For example, pixel 20 may have to be declared defective in ten out of twenty video frames before substituting its signal. Furthermore, filter 174 may allow previously substituted defective pixels 21 to perform adequately over time and be recharacterized as operative. For example, ten failures may result in substitution, but fifty non-failures or successes may redesignate the previously substituted defective pixel 21 as operative. It should be understood that the present invention contemplates any type of filter 174 to implement a substitution decision. Filter 174 may store the identity of defective pixels 21. This information may be used to substitute signals of defective pixels 21 even when the detection functions of detection and substitution module 28 are deactivated.

Signals 34 comprising signals produced by operative pixels 20 and substituted signals for defective pixels 21 are fed into post-processing module 30. The global gain adjuster 178 may implement standard television controls such as brightness, contrast, and other adjustments, to improve the picture of thermal scene 12 displayed on monitor 38. Synchronizer and symbol generator 180 may add display synchronization information and desired symbology, such as text or graphics, to signals 34. Monitor 38 receives the resulting video signals 36 and displays thermal scene 12 with any added symbology.

Although the present invention has been described with several embodiments, various changes and modifications may be suggested to one skilled in the art, and it is intended that the present invention encompass such changes and modifications as fall within the scope of the appended claims.

What is claimed is:

1. An apparatus for defective pixel signal substitution in a thermal imaging system, the thermal imaging system having a focal plane array with at least three pixels, the apparatus comprising:
   addressing circuitry operable to address a signal produced by at least one of the pixels;
   a reference generator operable to generate a reference value for the pixel;
   a subtractor having a first input coupled to the addressing circuitry and a second input coupled to the reference generator, the subtractor operable to output an error value representing a comparison of the produced signal and the reference value;
   a comparator coupled to the subtractor and operable to compare the error value to a predetermined threshold and to generate a substitution flag if the error value exceeds the predetermined threshold; and
   a substitutor coupled to the comparator and operable to substitute the produced signal of the pixel with a selected signal in response to the substitution flag.

2. The apparatus of claim 1, wherein the pixel produces the signal while the focal plane array receives thermal radiation from a thermal scene.

3. The apparatus of claim 1, further comprising a voltage supply circuit coupled to the pixels and operable to apply to the pixels a varying low level voltage superimposed on a bias voltage.

4. The apparatus of claim 1, further comprising:
   a voltage supply circuit operable to generate a varying low level voltage superimposed on a bias voltage; and
   a common electrode electrically coupled to the voltage supply circuit and the pixels.

5. The apparatus of claim 1, further comprising:
   a thermoelectric cooler thermally coupled to the pixels; and
   a controller coupled to the thermoelectric cooler, the controller operable to drive the thermoelectric cooler with a low level varying voltage superimposed on a temperature set point voltage.

6. The apparatus of claim 1, wherein:
   a first pixel and a second pixel are located adjacent to each other on the focal plane array;
   the addressing circuitry addresses in sequence the signal produced by the first pixel and the signal produced by the second pixel; and
   the substitutor substitutes the signal produced by the first pixel with the signal produced by the second pixel in response to the substitution flag.

7. The apparatus of claim 1, wherein:
   a first pixel and a second pixel are located adjacent to each other on the focal plane array;
   the addressing circuitry addresses in sequence the signal produced by the first pixel and the signal produced by the second pixel; and
   the reference generator outputs the signal produced by the first pixel as a reference value for the second pixel.

8. The apparatus of claim 1, further comprising:
   addressing circuitry operable to address signals produced by the pixels representing a video frame;
   a filter disposed between the comparator and the substitutor, the filter operable to accumulate substitution flags for the pixel over more than one video frame; and
   the filter further operable to direct the substitutor to substitute the signal produced by the pixel with the selected signal upon accumulation of a predetermined number of substitution flags over more than one video frame.

9. A method for post-delivery defective pixel signal substitution in a thermal imaging system having a focal plane with at least three pixels, for at least one of the pixels, the method comprising:
   addressing a signal produced by the pixel;
   generating a reference value for the pixel;
   generating an error value that represents a comparison of the produced signal to the reference value;
   generating a substitution flag if the error value exceeds a predetermined threshold; and
   substituting the produced signal of the pixel with a selected signal in response to the substitution flag.

10. The method of claim 9, wherein the step of addressing a signal produced by the pixel is performed while viewing a thermal scene.

11. The method of claim 9, wherein the step of addressing a signal produced by the pixel is performed while applying a voltage to the pixels, the voltage comprising a varying low level voltage superimposed on a bias voltage.

12. The method of claim 9, wherein the step of addressing a signal produced by the pixel is performed while applying a voltage to a common electrode electrically coupled to the pixels, the voltage comprising a varying low level voltage superimposed on a bias voltage.

13. The method of claim 9, wherein the step of addressing a signal produced by the pixel is performed while varying the temperature of the pixels using a thermoelectric cooler thermally coupled to the pixels.

14. A thermal imaging system having a post-delivery defective pixel signal substitution system, comprising:

a focal plane array having at least three pixels;

an integrated circuit substrate coupled to the focal plane array, the integrated circuit substrate operable to address a signal produced by at least one of the pixels of the focal plane array; and substitution circuitry coupled to the integrated circuit substrate, the substitution circuitry further comprising:
a reference generator operable to generate a reference value for the pixel;
a subtractor having a first input coupled to the integrated circuit substrate and a second input coupled to the reference generator, the subtractor operable to output an error value representing a comparison of the produced signal and the reference value;
a comparator coupled to the subtractor and operable to compare the error value to a predetermined threshold and to generate a substitution flag if the error value exceeds the predetermined threshold; and
a substitutor coupled to the comparator and operable to substitute the produced signal of the pixel with a selected signal in response to the substitution flag.

15. The system of claim 14, wherein the pixel produces the signal while the focal plane array receives thermal radiation from a thermal scene.

16. The system of claim 14, further comprising a voltage supply circuit coupled to the focal plane array and operable to apply to the pixels a varying low level voltage superimposed on a bias voltage.

17. The system of claim 14, further comprising:

a thermoelectric cooler thermally coupled to the focal plane array; and a controller coupled to the thermoelectric cooler, the controller operable to drive the thermoelectric cooler with a low level varying voltage superimposed on a temperature set point voltage.

18. The system of claim 14, wherein:

a first pixel and a second pixel are located adjacent to each other on the focal plane array;

the addressing circuitry addresses in sequence the signal produced by the first pixel and the signal produced by the second pixel; and the substitutor substitutes the signal produced by the first pixel with the signal produced by the second pixel in response to the substitution flag.

19. The system of claim 14, wherein:

a first pixel and a second pixel are located adjacent to each other on the focal plane array;

the addressing circuitry addresses in sequence the signal produced by the first pixel and the signal produced by the second pixel; and the reference generator outputs the signal produced by the first pixel as a reference value for the second pixel.

20. The system of claim 14, further comprising:

addressing circuitry operable to address signals produced by the pixels representing a video frame;

a filter disposed between the comparator and the substitutor, the filter operable to accumulate substitution flags for the pixel over more than one video frame; and the filter further operable to direct the substitutor to substitute the signal produced by the pixel with the selected signal upon accumulation of a predetermined number of substitution flags over more than one video frame.

* * * * *